Aug. 9, 1932.  W. A. PRINGLE  1,871,425
ADJUSTABLE SYNCHRONOUS APPARATUS
Filed July 15, 1931
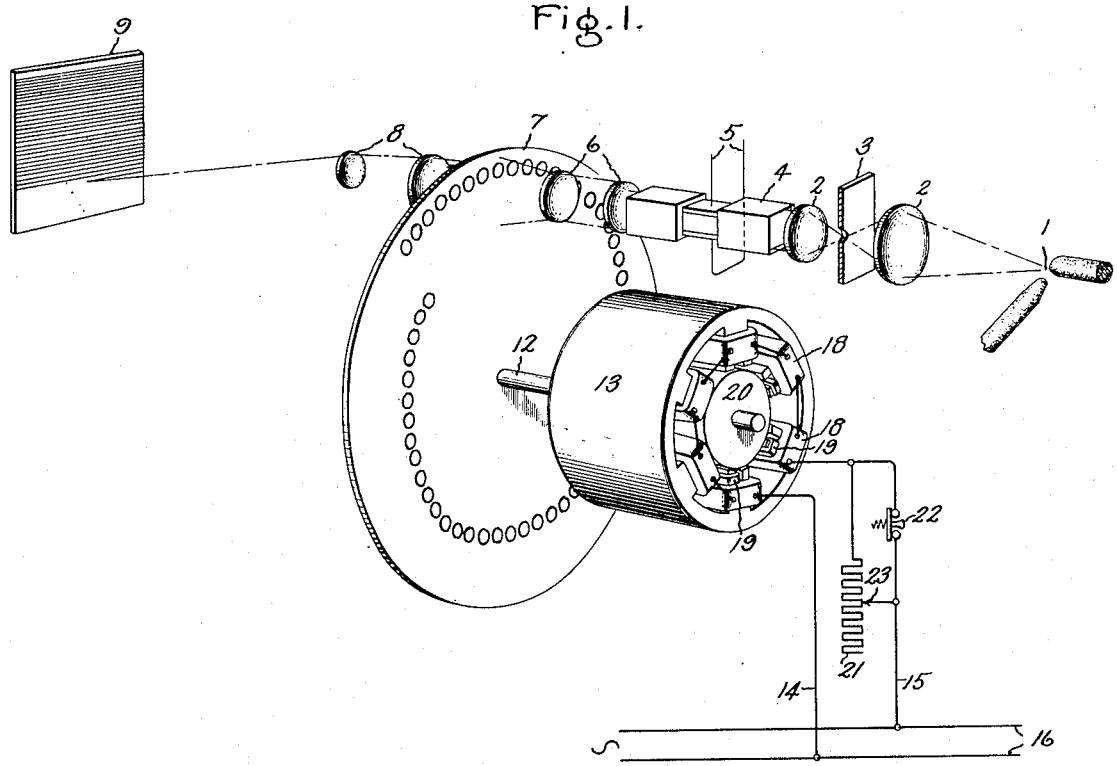
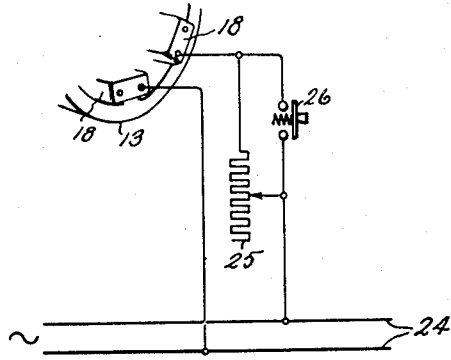
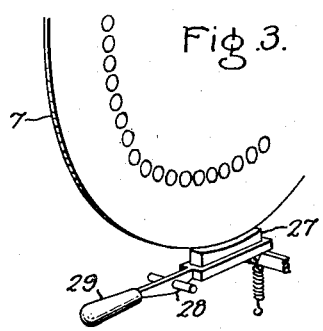
Inventor:
William A. Pringle,
by Charles E. Mullen
His Attorney.

Patented Aug. 9, 1932

1,871,425

UNITED STATES PATENT OFFICE

WILLIAM A. PRINGLE, OF FORT WAYNE, INDIANA, ASSIGNOR TO GENERAL ELECTRIC COMPANY, A CORPORATION OF NEW YORK

ADJUSTABLE SYNCHRONOUS APPARATUS

Application filed July 15, 1931. Serial No. 550,948.

My invention relates to electrical apparatus which normally operates in synchronism with an alternating current. In certain forms of such apparatus, such for example, as those applicable to stroboscopic and television uses it is desirable to be able to adjust or change the phase relation between a moving element of the apparatus and the alternating current an amount depending upon some particular result sought and thereafter to have the apparatus continue in synchronous operation while a fixed phase relation is maintained with the alternating current.

It is the object of my invention therefore to provide improved apparatus of this character which while normally operated synchronously with an alternating current may have its phase relation changed any amount desired during operation.

My invention will be better understood from the following description taken in connection with the accompanying drawing, and its scope will be pointed out in the appended claim.

Referring to the drawing, Fig. 1 is a perspective view and circuit diagram illustrating one embodiment of my invention; Fig. 2 and Fig. 3 are fragmentary views showing modifications.

While my invention is applicable to various uses I have chosen to illustrate it in the present application as forming a part of a television receiver. The optical system of this receiver may be variously constructed but as shown it comprises the source of light 1, the condensing lens 2, aperture plate 3, the Kerr cell assembly 4 having the input circuit 5 by which the received signals are applied to the cell, the lens 6 by which the modulated light is projected on the scanning disk 7 and behind the scanning disk the objective lenses 8 by which the image is projected on the screen 9. The scanning disk 7 is shown mounted directly upon the shaft 12 of the driving motor 13 which by the connections 14 and 15 is supplied with alternating current from the source of alternating current supply 16.

The motor 13 is a synchronous motor of the hysteresis type being shown in the present case as having six inwardly projecting poles each having thereon a field coil 18 which coils are illustrated as being series connected. Various well known means may be employed for making the motor self starting. By way of example of one such means, I have shown the polar projections divided into two parts one part of each being surrounded by a short circuited coil 19. It will be understood that the coils 18 of the field winding are so connected that alternate north and south poles are produced thereby. The armature member or rotor 20 is cylindrical in form being without polar projections and preferably constructed of high reluctance magnetic material whereby when the motor operates at synchronous speed the rotor will have on its surface a plurality of fixed poles corresponding in number to those of the field magnet.

Unless the picture as projected upon the screen 9 happens to be properly framed it becomes necessary to change the phase relation of the disk 7 with respect to the alternating current supply in order to produce the desired proper framing. Various means may be employed to change the phase relation of the disk and consequently the rotor 20 of the motor with respect to the alternating current supply. The means which I prefer to employ for effecting this result is shown in Fig. 1 whereby the voltage applied to the field coils 18 is lowered a sufficient amount to allow a slight slip to occur in the motor. In Fig. 1 I have shown in the motor connections the resistance 21 shunted around which is the hand switch 22 which switch normally short circuits the resistance but which when depressed opens the shunt around the resistance. In order to adjust the value of the resistance to suit line voltage and other conditions, I have shown at 23 one of the resistance connections as adjustable.

In the use of the apparatus disclosed in Fig. 1, it being assumed that the motor is operating in synchronism, if the operator finds that the picture reproduced on screen 9 is not properly framed he presses the switch 22 allowing slip to occur in the motor until proper framing is produced, when he releases the switch and immediately the motor will become locked in synchronism and continue as before in synchronous operation. Inasmuch as the rotor of this motor is without salient poles the rotor will lock into step with the rotating field at any instant at which the proper voltage is applied to the field winding.

If desired, the rotor may be caused to slip by applying an over-voltage to the motor field winding and in the modified form illustrated by Fig. 2 I have shown one means by which the motor may be so controlled. In this case the supply 24 provides the over-voltage which normally is cut down by the resistance 25 to the proper value for the motor to operate in synchronism and switch 26 when depressed closes a shunt circuit around resistance 25 thereby applying the over-voltage to the motor. As in Fig. 1 if the picture is improperly framed, the operator closes the switch 26 applying the over-voltage to the motor which results in a certain amount of slip. When the picture is seen to be properly framed, the switch is released after which the motor continues to operate in synchronism. In certain cases I may dispense with the resistance 25 and instead short circuit one or more of the field coils thus applying a higher voltage per coil on the remaining coils. The slip thereby caused is due not only to the smaller number of poles in use but to the fact that the flux on the remaining poles is increased to a value which tends to cause slip.

As mentioned above the motor may be made self-starting by well known electrical means other than that illustrated, such for example, as by the use of a split phase winding having a capacitor in one of the phases, in which case a resistance may be temporarily inserted in either phase to cause slip or certain poles of either winding may be short circuited as already described.

Instead of causing the motor to slip by electrical means as previously described I may produce the slip by increasing the load upon the motor, as for example, by applying a brake thereto. In Fig. 3 I have shown by way of illustration the small brake 27 on lever 28 having the handle 29 which when moved by the operator applies a retarding force to the disk 7. In this form of my invention if the picture is seen to be incorrectly framed the operator applies the brake 27 sufficiently to cause slip to occur in the motor thereby bringing the picture into a correctly framed position at which time the release of the brake allows the motor and disk to continue in synchronous operation.

I have chosen the particular embodiments described above as illustrative of my invention and it will be apparent that various other modifications may be made without departing from the spirit and scope of my invention which modifications I aim to cover by the appended claim.

What I claim as new and desire to secure by Letters Patent of the United States is:

In television apparatus, a synchronous motor of the hysteresis type, a scanning disk driven thereby, circuit connections between the motor and a source of alternating current supply, and picture framing means in said connections comprising a resistance and a switch for controlling the flow of current through the resistance whereby the motor can be caused to slip any desired amount and subsequently immediately to resume synchronous operation.

In witness whereof, I have hereunto set my hand.

WILLIAM A. PRINGLE.